United States Patent
Lewis et al.

(10) Patent No.: US 6,759,077 B1
(45) Date of Patent: Jul. 6, 2004

(54) BREAKFAST CEREAL BISCUIT COMPRISING WAXY GRAIN

(75) Inventors: Deborah Ann Lewis, Rushcutters Bay (AU); David Adrian Lewis, Rushcutters Bay (AU); Victor Marcus Lewis, Rushcutters Bay (AU)

(73) Assignee: Byron Australia Pty. Ltd., Ruschcutters Bay (AU)

( * ) Notice: Subject to any disclaimer, the term of this patent is extended or adjusted under 35 U.S.C. 154(b) by 0 days.

(21) Appl. No.: 09/856,133

(22) PCT Filed: Nov. 17, 1999

(86) PCT No.: PCT/AU99/01016

§ 371 (c)(1),
(2), (4) Date: Aug. 24, 2001

(87) PCT Pub. No.: WO00/28836

PCT Pub. Date: May 25, 2000

(30) Foreign Application Priority Data

Nov. 17, 1998 (AU) .............................................. PP 7162

(51) Int. Cl.⁷ .............................................. A23L 1/164
(52) U.S. Cl. ...................... 426/619; 426/506; 426/507; 426/508; 426/618; 426/620; 426/621
(58) Field of Search ................................ 426/508, 549, 426/615, 618, 619, 641, 620, 621, 506, 507

(56) References Cited

U.S. PATENT DOCUMENTS

| | | | |
|---|---|---|---|
| 4,888,180 A | | 12/1989 | Wu |
| 5,391,388 A | * | 2/1995 | Lewis et al. ................. 426/620 |
| 5,464,647 A | * | 11/1995 | Messick ...................... 426/618 |
| 5,972,413 A | * | 10/1999 | Whitney et al. ............ 426/620 |
| 6,287,626 B1 | * | 9/2001 | Fox ............................. 426/518 |

OTHER PUBLICATIONS

Georget, D.M.R & A.C. Smith, (1995) "Mechanical Properties of Wheatflake Components", Carbohydrate Polymers vol. 28 pp. 305–311.

\* cited by examiner

*Primary Examiner*—Lien Tran
(74) *Attorney, Agent, or Firm*—Scully, Scott, Murphy & Presser

(57) ABSTRACT

The present invention provides an improved breakfast cereal biscuit comprising grain which includes waxy grain in an amount of at least 20% by weight of total grain content. The grain has been hydrated and cooked either sequentially or simultaneously, rolled into flakes, and either agglomerated and toasted into a desired biscuit shape or toasted and agglomerated into a desired biscuit shape. A process for the production of the improved breakfast cereal biscuit is also provided. The improved breakfast cereal biscuit typically exhibits extended bowl life, has improved nutritional qualities, is tender and crisp in texture, has better flavors, and requires reduced energy in the manufacturing process, when compared to standard flaked wheat breakfast cereal biscuits.

30 Claims, 1 Drawing Sheet

BREAKFAST CEREAL BISCUIT COMPRISING WAXY GRAIN

FIELD OF INVENTION

Figure 1:
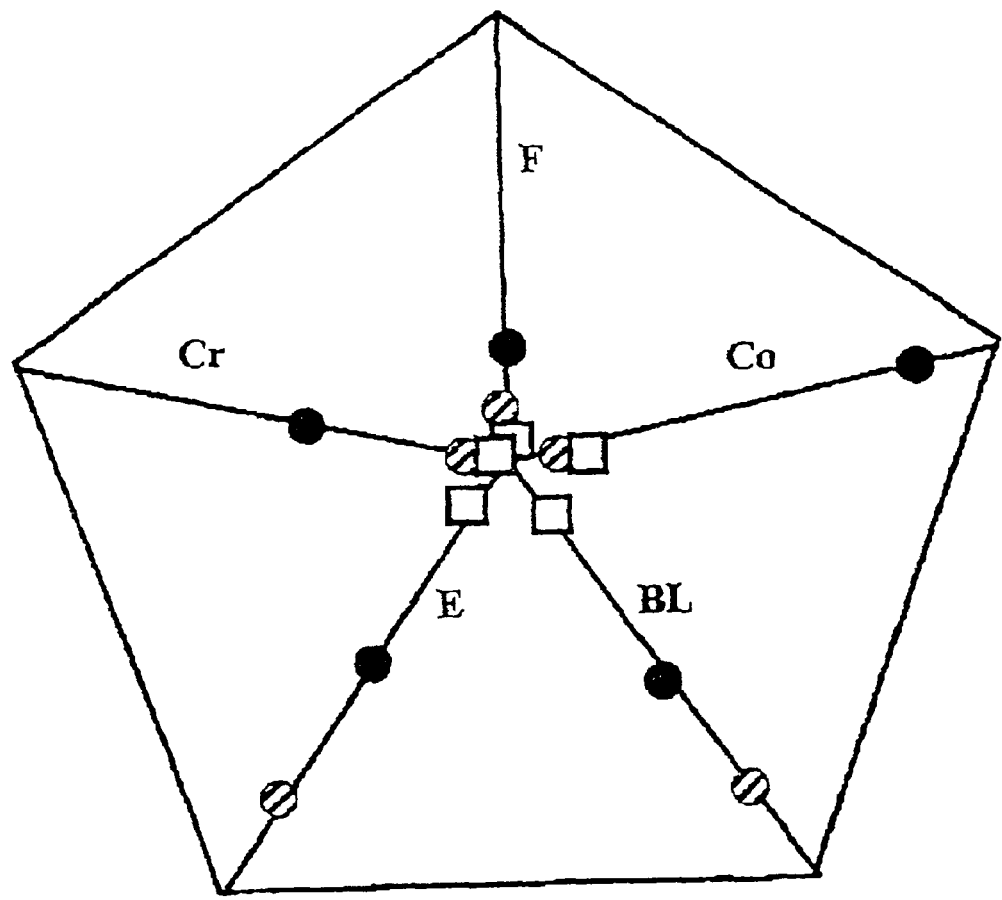

The present invention relates to an improved breakfast cereal biscuit and in particular, to an improved breakfast cereal biscuit comprised of grain which is at least 20% by weight waxy grain. The present invention also relates to a method of manufacture of such improved breaks cereal biscuits.

BACKGROUND OF THE INVENTION

Breakfast cereal biscuit (BCB) products make up a significant proportion of t international ready-to-eat breakfast cereal market. Some examples of BCB products available on the world market are Weet Bix (Sanitarium Health Food Company, 145 Fox Valley Road, Waroonga, NSW 2076, Australia), Weetabix (Weecabix Ltd. Burton Latimer Ketteing Northamts, NN15JR, England) and Vita Brits (The Uncle Toby's Company Limited, Barkly Street, Wahgunya, Victoria, 3687, Australia). These products which have been available for many years are usually made from wheat, which have other optional inclusions such as flavorings, nutritional supplements, pre-puffed or pre-toasted cereals, fruits, bran, salt, sweeteners or stabilizers.

BCBs are usually marketed as biscuit typically with dimensions of about 8×4×2 cm as well as in an assortment of shapes such as cubes, cylinders etc. They are generally eaten with cold or hot milk and the flakes of grain within the biscuit become soft and mushy within only 2–3 minute of the addition of cold milk and quicker with hot milk. A feature of the BCBs is that the flattened grain flakes are visually discernible within the biscuit produced. This is a feature which distinguishes this type of BCB from shredded wheat biscuits wherein individual grains are not discernible.

The BCBs are generally made from the whole wheat kernel (germ, bran and endosperm), by initially hydrating and cooking the kernel a then rolling the cooked grain into very thin flakes which are then agglomerated and formed into biscuits. A description of this type of process is provided in the video entitled "Breakfast is Ready", produced in 1993 by Video Education Australasia Pty Ltd, (111 Mitchell Street, Bendigo, Victoria, 3550, Australia).

An alternative method involves the grains being hydrated and cooked followed by flaking and agglomeration along with the addition of flavours, colours, fruits, etc. optional predrying and then the resultant mixture formed in the desired shapes and toasted dry to the final desired biscuit product.

Another type of grain-derived biscuit or cake can be produced from puffed whole grains, as described by Wu in U.S. Pat. No. 4,889,180. These product are produced from non-waxy rice, wheat, rye, corn and the like. The grains are conditioned to a predetermined moisture content, formed in a pre-heated mould and high temperature expanded. Consequently, the taste and texture of this products is quite distinct from the faked grain BCBs. The puffed grain biscuits or are also generally eaten in the form of a bread substitute, rather than with warm or cold milk, as is the case with the flaked grain BCBs.

Waxy grains have not generally been contemplated in the manufacture of BCBs. Waxy grains tend to become sticky when hydrated during cooking and processing steps. This often results in the cooked waxy grains forming a glue-like material and sticking to surfaces of the cooking and processing apparatus. The difficulties associated with processing waxy grain has meant that non-waxy grain has been used in the preparation of BCBs.

There are a number of drawbacks with the BCB producers currently available. One significant disadvantage is that when the BCB is combined with cold milk, the biscuit rapidly absorbs the milk and rapidly loses its crispy texture to become soft and mushy, usually within two to three minutes. The softened flakes also become capable of being dispersed into the milk very easily with a spoon. This short "bowl life", which refers to the time it takes for a cereal to become soft and mushy when immersed in cold milk, is considered by many consumers To be a disadvantage with BCB products. For example, compared with the bowl life of two to three minutes for known wheat flake BCB, corn flake cereals generally have a bowl life of five to six minutes and oven crisped rice cereals (for example Kellogg's Rice Krispies, Kellogg Co. 235 Porter Street, Battle Creek, Mich. 49016, U.S.A.) generally exhibit a bowl life of six to seven minutes. Within the breakfast cereal industry, a bowl life of six to eight minutes is considered to be desirable.

Furthermore, attempts have been made so improve she nutritional quality of, and to add textural and flavour variety to, flaked wheat BCBs, by adding other cereal grains such as rice, rolled oats, sesame seeds etc. Such products have tended to be more expensive than the simple wheat BCBs, and have in addition been shown to produce a product which is less tender, less crisp and generally less appealing to consumers than the all-flaked wheat BCBs.

It is an object of the present invention to overcome or at least substantially ameliorate some of the problems associated with the flaked grain BCB products known to date. Other objects according to the present invention will become apparent from the following description thereof.

SUMMARY OF THE INVENTION

It has been surprisingly found by the present inventors that by producing BCBs from grain which is at least 20% by weight waxy grain, it is possible to produce a flaked grain BCB product which exhibits extended bowl life, has improved nutritional qualities and is tender and crisp in texture. In particular, BCBs produced from waxy barley develop pleasant natural malted flavours without the need for malty flavour additions, at the same time as requiring reduced energy in the manufacturing process, when compared with standard BCBs produced form flakes of wheat.

Thus, according to one embodiment of the present invention there is provided a breakfast cereal biscuit comprising grain wherein said grain includes waxy grain in an amount of at least 20% by weight of total grain content.

Preferably waxy grain comprises at last 30% by weight, more preferably 90% by weight, most preferably 100% by weight of total grain content.

Preferably the waxy grain is selected from barley, corn, wheat, rice and sorghum, more preferably the waxy grain is barley.

In a particularly preferred embodiment the barley is hydrated to a moisture content of up to 30%, more preferably from 24to 29%, most preferably about 29% w/w.

The BCB of the invention contains flaked waxy grain which typically has been processed by hydration and cooking of the grain either sequentially or simultaneously or both, rolled into flaked, agglomerated into a desired biscuit shape, and toasted. Alternatively the rolled grain is toasted prior to agglomeration into the desired biscuit shape.

One advantage of using waxy grain, in particular barley, is that the processed flakes can be agglomerated without the need for additives such as binders, salt, flavours and other agents to prepare a suitable flaked grain BCB produce.

Nonetheless it is sometimes desirable to add one or more of other grain or grain products, nuts, fruits, fruit juice, nutritional supplements, flavours, colours, salt, sweeteners, stabilisers and the like in the preparation of the biscuits.

According to another embodiment of the present invention there is provided a process for producing a breakfast cereal biscuit comprising the steps of:

a) selecting grain which includes waxy grain in an amount of at least 20% by weight of total grain content;
b) hydrating and cooking said grain either sequentially or simultaneously or both,
c) rolling cooked grain into flakes; and either
d) agglomerating the flakes of step c) into a desired biscuit shape; and
e) toasting the product of step d); or
f) toasting the flakes of step c); and
g) agglomerating the product of step f) into a desired biscuit shape.

DETAILED DESCRIPTION OF THE INVENTION

Throughout this specification is the context requires otherwise, the word "comprise", or variations such as "comprises" or "comprising" or the term "includes" or variations thereof, will be understood to imply the inclusion of a stated element or integer of group of elements or integers but not exclusion of any other element or integer or group of elements or integers. In this regard, in constructing the claim scope, embodiment where one or more features is added to any of the claims is to be regarded as within scope of the invention given that the essential features of the invention as claimed are included in such an embodiment.

Throughout this specification and the appended claims, it is intended that the team "breakfast cereal biscuit" or the abbreviation "BCB" means a biscuit produced from the agglomeration of flaked cereal grains. Such biscuits are usually consumed in conjunction with warm or cold milk.

Breakfast cereal biscuits are generally intended to be consumed as a breakfast meal, in conjunction with milk or a milk substitute. Milk substitutes may include for example, soy milk or even fruit juice or water, all of which have the effect of reducing the crispness of the BCB at least to some extent. Naturally however, it is possible for BCBs to be consumed as a meal or snack at other times of the day, or without the addition of milk or a milk substitute. For example, some consumers may wish to use the BCBs as a base for toppings such as butter, jam, honey or even savoury toppings such as ham and cheese. Up until the present time there has been no consideration given to production of BCBs from waxy grains. What is meant by "waxy grain" is grin wherein about 10% or less of the starch present within the grain is in the form of amylose. As will be understood by persons skilled in the art, barley, oats and rice are comprised of four major components, namely the hull or husk, the bran, the germ and the endosperm, however, some varieties of barley and oats lack a hull layer, and are known as naked varieties. The bran layer includes fibre and protein with some vitamins and minerals. The endosperm is comprised of carbohydrate, in the form of starch and protein, and the germ includes fat, protein and fibre as well as same vitamins and minerals. In the case of waxy grains, most of the starch present within the endosperm is in the form of amylopectin, rather than a mixture of amylopectin and amylose present in non-waxy grain. The waxy grains contemplated by the present invention include waxy grain of barley, corn (maize), sorghum (milo), rice and wheat as well as other varieties of grain or starchy seeds which contain 10% or less of their starch content as amylose. It is also intended that the waxy can be combined with other waxy grains so that, for example, waxy barley can be combined with waxy corn. It is also intended that the BCBs according to the present invention can be produced from a combination of waxy and non-waxy grain, as long as there is at least 20% of total grain weight comprised of waxy grain. Preferably, however, at least 50% of the total grain weight will be comprised of waxy grain, more preferably at least 75 %. Particularly preferably, waxy grain will comprise at least 90% of the total grain weight, an most particularly preferred is the situation where waxy grain is present in the BCB product to the exclusion of non-waxy grain. Preferably the waxy grain is waxy barley.

The general process followed in producing the breakfast cereal biscuits according to the invention is that the grain, which should be of good quality, is initially cleaned and graded as desired to ensure that it is free of infestations, dirt or stones. Grains which have hulls will need to be dehulled. It is then possible, if desired, to fully or partially remove the bran layer. For example, 5–15% of the outer bran may be removed. It is to be stressed however, that this removal of bran is purely optional, and is conducted in order to aid the process of hydration of the grain or to modify the eating quality of the final food. It is also optional to crack the grain (without excessive damage) for example by passage through a roller mill. This process will aid moisture absorption.

The grain is to be hydrated and cooked, and these steps may be conducted separately or in combination For example, hydration can be conducted simply by steeping the grain in water or condition to the require moisture content by methods well known in the grain processing industry. It is possible at this stage, if stage, id desired, also to add sugars, salts or other flavorings or additives for example by dissolving the added material(s) in the water absorbed. Following hydration the grain may be cooked, for example, in an autoclave or rotary steam pressure cooker. Equally however, the cooking may to be conducted without any prior hydration step, such that the hydration of the grain takes place during the cooking. Other materials such as sugars, salt, malt and other flavorings or additives may be added to the cooking process. A third option is to combine these two hydration methods by partiality hydrating the grains prior to cooking followed by addition of the balance of moisture during the cook phase. The moisture content to which the grain is hydrated is dependent upon grain type. Preferably, the moisture contents of the grain is increased to at least about 17–18% during the hydration and cooking stages depending upon grain type and characteristics desired in the final product. In some cases however, hydration of the grain may be substantiality higher, so that the grain will comprise nearly 50% moisture content. It is important, however, that the grain is not overly moist when the process of rolling into flakes is conducted, so if the moisture is excessively high at this stage, the flakes will lose their integrity during the rolling process and material may adhere to the rollers.

As will be well understood, there is a considerable degree of flexibility associated with the moisture content, cooling time and temperature. The overall objectives of the hydration and cooking steps are to increase the moisture content of the grain and to soften the grain in preparation for rolling.

The addition of moisture also aids gelatimisation of starch during heat application. As will also be understood, it is generally the case that the adoption of increased cooking temperature will require decreased cooking time. For example, it may be appropriate to cook the grain for between about 20 minutes and about 90 minutes at temperatures ranging between about 100° C. and 180° C. During the cooking phase, substantially all of the starch within the grain will have been gelatinised Unfortunately, the cooking process rends to destroy many of the vitamins, such as B group vitamins, which may be present in the uncooked grain. Of course, by requiring a lesser period of cooking the produces of this invention lose a lesser amount of the contained natural vitamins. Nonetheless, it may therefore be appropriate to add various nutrients, flavours and the like to the flakes, at any suitable stage of the process. Such additives include vitamins, minerals or other nutritional supplements, flavours, colours, salt, sweeteners and/or stabilisers.

If it is necessary for the moisture content of the cooked grain to be reduced following the cooking step, this may conveniently be conducted by allowing the cooked grain to air-dry, either in ambient air or by exposing the cooked grain to warm air for a period of time.

Upon completion of the cooking step, and the above described drying step if necessary, the cooked grain is passed through a roller mill which is set at a very fine gap, in order to produce preferably between about 0.01 mm and about 0.2 mm or greater, depending upon grain size and type. After rolling, the flake produced remain integral and can then be agglomerated and formed into the did biscuit shape.

"Agglomeration" is intended to mean the related processes of binding the grain flakes together and forming into the desired biscuit shape. In one form of the invention, agglomeration is achieved simply by allowing the flakes to fall onto a moving conveyor belt such that the flakes pile upon one another to form a mat of desired thickness. Naturally, the speed of the conveyor will determine the mat thickness. The flakes can then be passed through a press to compress the mat and to aid in binding the flakes together. It has been found that flakes produced from wheat are generally quite sticky due to addition of salt during the hydration or cooking phase. The added salt appears to aid in improving adhesion of the flaked grains in the agglomeration step. One advantage of using waxy grains like barley is that salt addition is not necessary in order to bind the grain flakes.

Once the mat of agglomerated flakes has been compressed to the appropriate thickness, it may be cut into the desired biscuit shape. Generally, this will be a bar or cuboid shape although the formation of other shapes is equally possible if desired.

It is also possible for the agglomeration step to take place by placing flakes within perforated moulds of the desired shape, compressing the flakes and then removal of the shaped biscuit from the mould after toasting. This alternative process of agglomeration is somewhat more labour intensive than the formation of a mat which can be compressed and cut, although it does provide more flexibility in the nature of biscuit shapes which can be produced.

An alternative method for BCB production involves the toasting of the grain flakes prior to agglomeration into the desired shapes. This may be preferred if additional heat sensitive components or other additions are required where they will be added during the agglomeration or after.

At the time of agglomeration it may also be appropriate for other components to be added to the biscuit. For example, it is possible at this stage, as mentioned above, for nutritional supplements such as vitamins or minerals, flavours, colours, salt, sweeteners and/or stabilisers to be added. It is also possible however, for other grains or grain products, nuts, fruits or grain products, it is intended to mean that for example, pre-rolled, pre-puffed or pre-toasted grains or grain components may be included within the biscuit form. The addition of such components may favourably alter the flavour and/or texture of the final BCB product.

Following the agglomeration step which includes shaping into the desired biscuit shape, the formed biscuits optionally are toasted. During the toasting phase, the biscuit are heated to between about 110° C. to about 240° C. for a period of between about 30 seconds and about 30 minutes depending on the desired result, in order to reduce the moisture content from between around 16–50% to between about 1–8%. During this toasting stage, the biscuits will undergo texture, flavour and colour changes associated with the moisture content reduction and heat application. Also, volume reductions during toasting of between 5–20% cm be expected.

As with the cooking step described above, there is significant flexibility associated with the time and temperature adopted when toasting the BCB product. Toasting may be conducted by means well known in the art, for example by utilisation of a forced hot air toaster, or by baking in a hot oven.

The product, once toasted and formed if required, is then ready for packaging and distribution.

In one optional form of the invention the toasted biscuit may be coated with a coverture as desired, for example with chocolate, yoghurt, honey, sugar glaze, or filled with flavouring etc.

It has been surprisingly found by the present inventors that utilising mixture which comprises at least 20% by weight waxy grain, results in a BCB product which exhibits greatly increased bowl life. By way of illustration, as will be shown in the following examples and accompanying drawing (FIG. 1), a BCB product which includes 100% of grain weight of waxy barley, exhibits a bowl life of around eight minutes, which is significantly improved relative to the bowl life obtained for non-waxy wheat BCBs, as currently commercially available, of around three mixture or less.

Another significant advantage of the present invention is that it has been surprisingly found that the energy requirement associated with cooking BCBs produced from substantially waxy grains is quite significantly reduced relative to the energy requirements for cooking BCB products produced from non-waxy grain. This surprising result is of significant commercial importance, and means that the overall production costs of the BCBs of the invention is markedly reduced relative to that of known BCBs. For example, no manufacture BCBs from when, cooking requirement was 75 minutes at 127° C. followed by toasting at 160° C., 15 minutes. This contrasts the condition for waxy barley which requires cooking for 30 minutes at 125° C. followed by toasting at 130° C. for 15 minutes.

It has also been found that the BCBs produced from some waxy grains, especially those produced from waxy barley, develop an appealing malted flavour and rich golden brown colour, without the need of any additional sugars or mark in order to produce this improved flavour and colour profile. Importantly also, BCBs produced from waxy grains, and again particularly waxy barley, have significant nutritional relative to the commercially available BCB product. Some waxy grains appear to contain an increased level of dietary fibre and particularly soluble fibre, relative to their non-waxy counterparts. For example, waxy barley contains 14.7% dietary fibre and less than 6% soluble fibre, whereas non-waxy wheat comprises only 11% dietary fibre and less than 1% soluble fibre (David Oakenfull, Food Applications for Barley, presented at 5th International Oat Conference and 7th International Barley Genetics Symposium Saskatoon. August 1996). Waxy barley is also high in β-glucan content, which is a particularly beneficial form of soluble fibre (McIntosh, G. H. et al., Am. J. Clin. Nutr. 1991, 53:5, pp 1205–1209; Uusitupa, M. I. et al, J. Am. Coll. Nutr. 1992, 11:6, pp 651–659). Soluble dietary fibres are defined as the non-cellulose fraction of the NSP-hermicelluloses which include the (1 3) (1 4) mixed linkage (β-glucans, pectins, gums and mucilages (Oakenfull ibid).

A further, surprising attribute of the present invention is that product wastage is markedly reduced due to a reduced tendency for the BCB product to break or form dust. This has obvious economic benefits, as well as being appealing to consumers who will be less likely to receive broken or damaged products.

Another surprising attribute of the invention is that BCBs produced from waxy bailer do not require added salt, is necessary in commercial wheat BCBS.

DETAILED DESCRIPTION OF THE FIGURE

The present invention will now be described by way of example only and with reference to the figure, wherein:

FIG. 1 shows a diagrammatic representation of five highly preferred processing and product attributes of three breakfast cereal biscuit grains. The three grain are represented as follows:

☐ Waxy Barley
Ø Wheat
● Regular Barley

The center of the pentagon in FIG. 1 represents the more desirable properties of the five attributes for biscuit products, whilst the vertices represent the lesser desirable properties.

The five processing and product attributes represented by the radicals of the pentagon are defined as follows:

BOWL LIFE (BL): Time in minutes for biscuit cereal to become soft and mushy when placed in cold milk. The vertex represents 0 minutes and the centre represents 10 minutes.

CRISPNESS (Cr): Textural characteristic being brittle and firm but yielding to a comfortable amount of pressure generated by the jaw when eaten. A crisp and not mushy texture is desirable. The vertex represents mushy texture and the center represents crisp texture.

FTRMNESS (F): Degree of hardness or tenderness associated with the product when eaten. A tender and not hard product is most desirable. The vertex represents a hand product and the center represents a tender product.

ENERGY (E): Amount of cooking energy required in processing to achieve the optimum product which includes full gelatinisation of the product's starch content, development of desirable colour and flavour and texture characteristics. The vertex represents 12 KPa.min×$10^3$ and the center represents 4 KPa.min×$10^3$.

COHESIVENESS (Co): The degree to which individual flakes of grain bind together within the biscuit during processing and in the final product. A highly and strongly cohesive character is most desirable. The vertex represents strong cohesive character and the centre represents strong cohesive character.

By quantifying these different attributes, it can be summarised that the optimum and most desirable breakfast biscuit displays a long bowl life, a crisp and tender texture, highly cohesive flakes and a low energy input for manufacture. Energy used for processing each grain in type also reflects processing time. Shorter processing times are found in the following examples and reflected in this invention. A shorter processing time is advantageous since this allows the production of a greater quantity of food in a given time and hence reduces the cost of capital equipment relative to volume of production. With reference to three different grains, wheat, regular barley and waxy barley in FIG. 1, it can be seen that any product which plots closest to the center of the pentagon will be a superior and more desirable biscuit product. In is case, waxy barley gave the longest bowl life, least energy consumption, and desirable cohesiveness and textural characteristics of the three grain. Although wheat scored well in crispness, firmness and cohesiveness, it scored poorly in bowl life and had the highest energy consumption. Regular barley had the poorest rating in all categories except energy and bowl life, in which it rated better than wheat but worse than waxy barley.

The present invention will now be further described with reference to the following non-limiting examples.

EXAMPLE 1A

A ready to eat barley biscuit cereal product was made from a hulled variety of waxy barley having less than 10% amylose content and about 9–10% moisture content. The grain was lightly peeled (in an abrasive-type mill eg; satake Engineering Company Ltd Nishibon-machi, Saijo, Hagashi Hiroshima-shi. Japan) to remove the hull but not the bran layer. It will be understood that if a hulless type of waxy barley is used, th de-hulling step is not necessary. It was then hydrated in water to 29% moisture content. This was achieved by numbling the grain with the appropriate volume of water until the grain had absorbed the entire volume of solution and the grains remain separate and integral (about 30 minutes at 24° C.). The hydrated grain was the cooked in an autoclave in live steam at 125° C. for 30 minutes to gelatinise the starch. The cooked grain was quite separate and integral at this stage. The hot grain was then passed through a roller mill set at a gap width between the rolls of 0.03–0.04 mm which compressed the grain to a flake. The roller mill had smooth rollers moving at identical speeds. The flaked grain was cohesive and stuck together when gently compressed. The flaked grain was packed into meal forms made from stainless steel mesh of the required dimension to give a suitable breakfast cereal biscuit (eg. 22 g cereal per 15×75×51 mm mould). The thus-formed biscuits were then toasted at 130° C. with hot air blown through the biscuit to achieve even heat distribution throughout the biscuit for 13 minutes, by which time a light golden colour had developed. At this stage the product contained 2–3% moisture content. The volume of the biscuit was decreased by about 25% during toasting and was readily removable from the stainless steel mesh forms. This method of preparation was designed to simulate method used in industrial production of BCBS.

This method was also used for other grains discussed below in Table 1, except for the times and temperatures which were are altered as required.

In the final biscuit product individual whole barley flakes were still discernible within the bound grain mass. The grain was a warm golden toasted colour.

The finished barley product can be eaten as is as a dry biscuit being tender, crisp and tasty. Alternately, the barley biscuit can be as a cold breakfast cereal in a bowl with hot or cold milk. In cold milk the barley biscuits have a fresh, crispy and crunchy texture. The grains within the biscuit soften quite slowly without the biscuit losing its overall shape or dispersing into the milk. Surprisingly, the individual flaked grains maintain their identity even through they eventually become softer with time. The waxy barley BCB has a pleasant toasted flavour with a naturally slightly sweet malty character.

EXAMPLE 1B

A ready-to-eat barley biscuit cereal product was prepared from the same hulled waxy barley as in example 1A except the cooking conditions used to make the biscuits therefrom were the same as used in Example 2B-(b) for wheat-based biscuits. The hulled waxy barley was hydrated to 30% moisture content with 1.5% added salt. The hydrated grain was then cooked at 127° C. for 75 minutes at which stage the grains were excessively sticky and very dark in colour. The grain was rolled to form flakes but the grain built up on the roller mill and was deemed too difficult to process at this stage. The gains had browned too much to give an acceptable food product.

EXAMPLE 1C

A ready-to-eat barley biscuit cereal product was prepared from the same hulled waxy barley as in example 1A except the grain was prepared by hydration to 42% moisture content. This moisture content represented near complete hydration of the grain. This was achieved by steeping the grain in water at 50° C. for the required time to reach 42% moisture (30 minutes). Alternatively the grain was hydrated during cooking by addition of the required water to the grain in the cooker. The grain was then cooked at either 121 C. 123° C. or 125° C. for 30 minutes. The grain was fully gelatinised at this point as judged by the lack of chalkiness in the grain interior. The grain produced from each condition could not be passed successfully through a roller mill as in example 1A because it was too sticky, the grains were clumped together, stuck to the rolls and could not be processed into a breakfast cereal biscuit product. Alternatively, instead of rolling the grain directly out of the cooker, the grain was first dehydrated to a moisture content (less than 30% moisture) at which point the grain became separate and the dried grain could pass through the roller mill. These required surface moistening to produce cohesive flakes and acceptable biscuits. However this method was deemed impractical as the grains would be too sticky to remove from a commercial rotary cooker.

EXAMPLE 1D

A ready-to-eat barley biscuit cereal product was prepared from the same barley grain as in example 1A except the grain was hydrated to either 25%, 29% or 35% moisture content and cooked at 121° C. for 30 minutes. The grain was not fully gelatinised except for the 35% moisture content sample which was very sticky, would be difficult to remove from a rotary cooker and could not be used in subsequent steps without first dehydrating the grain as in example 1B. The remaining sample grain was then passed through a roller mill to produce flakes as in example 1A, except the resultant flakes were not cohesive and did not stick together and could not be used to form a successful biscuit product. The toasted biscuits were not crisp and tender and the flakes fell apart from the biscuit.

EXAMPLE 2A

A ready-to-eat wheat biscuit cereal product was made from non-waxy regular whole wheat grains having a moisture content of 10% and a protein content of 11%. The grain was highly peeled (in an abrasive-type mill eg; Satake Engineering Company Ltd. Nishihon-machi, Saijo. Hagashi Hiroshima-shi, Japan) to remove less than 5% of the weight of the grain to and in hydration of the grain. It was then hydrated with water to 30% moisture content. This was achieved by tumbling the grain with the appropriate volume of water until the grain had absorbed the entire volume of water and the grains remain separate and integral (about 50 minutes at 24° C.). This is longer than with waxy barley as seen in example 1 (30 minutes). The hydrated grain was then cooked in an autoclave in live steam under the following regimes: 125° C. for (a) 20 minutes, (b) 30 minutes, (c) 40 minutes and (d) 50 minutes and at (e) 128° C. for 30 minutes or at (f) 130° C. for 30 minutes.

In all samples the cooked grain was quite separate and integral at this stage. The cooked grain was not fully gelatinised in all samples. This is in contrast to waxy barley (Example 1A) which gave full gelatinisation after cooking at 125° C. for only 30 minutes. The hot grain was then passed through a roller mill set at a gap width between the rolls of 0.03–0.04 mm which compressed the grain to a flake. In all samples except (d) and (f), the flaked grain was not cohesive and the flakes would not stick together as required by an acceptable process. In samples (d) and (f) the flaked grain exhibited an improved degree of cohesiveness but was not optimal. In contrast, flaked waxy barley was cohesive and the flakes adhered together (Example 1A) at this stage.

The flaked grain was packed into forms made from stainless steel mesh as in Example 1A. The thus-formed biscuits were then toasted at 130° C. with hot air blown through the biscuit to achieve even heat distribution throughout the biscuit for 13 minutes. At this stage the product contained 2–3% moisture content. The resultant biscuits were lighter in colour than commercial wheat biscuits and they were hard and dense and not crisp. All the biscuit samples were too firm to eat and exhibited various degrees of chalkiness and were considered unacceptable.

EXAMPLE 2B

A ready to eat wheat biscuit cereal product was made from non-waxy regular whole wheat grains having a moisture content of 10% and a protein content of 11%. The grain was lightly peeled as before. It was then hydrated in water to 30% moisture content and 1.5% NaCl. This was achieved by tumbling the grain with the appropriate volume of water and salt until the grain had absorbed the entire volume of solution and the grains remain separate and integral (about 60 minutes at 24° C. The addition of salt to the solution increased the time needed for the grains to fully absorb the added solution. The hydrated grain was then cooked in an autoclave in live steam under the following regimes: 127° C. for (a) 60 minutes and (b) 75 minutes.

The cooked grain of both samples was quite separate and integral at this stage and no chalkiness was evident. The hot grain was then passed through a roller mill set at a gap width between the rolls of 0.03–0.04 mm which compressed the grain to a flake. The resultant flakes in sample (b) were cohesive and easily stick together when gently compressed in the palm of one's hand or in metal forms for toasting. This feature was considered optimal for the process. Flakes produced in sample (a) were less cohesive and did not stick together as well as in sample then (b) or as well as with waxy barley (Example 1A). Sample (b) was then packed into metal mesh forms and toasted at three different temperatures: 150° C., 155° C. and 160° C. for 15 minutes each. The resultant biscuits were all similar in bowl life of 3 minutes which is typical of commercial wheat biscuits. Only the sample toasted for 15 minutes at 160° C. because fully dry, crisp and had developed a warm brown toasted colour. Sample (b) when toasted for 15 minutes at 160° C. was considered acceptable and most similar to commercial wheat breakfast cereals. The energy expenditure required to produce an acceptable wheat biscuit (cook: 127° C., 75 minutes; toast: 160° C., 15 minutes) was much greater than that required for waxy barley (cook 125° C., 30 minutes; toast: 130° C. 13 minutes). In contrast to waxy barley (Example 1A), in order to achieve wheat flakes which stick together, the addition of salt was required. This represents a processing option to either add salt or not when using waxy barley instead of wheat.

EXAMPLE 3

A ready-to-eat barley biscuit cereal product was made from a hulled variety of waxy barley and biscuits prepared as in Example 1 except the dehulled grain was hydrated in a solution of 1.5% sodium chloride and 5% sucrose to 29% moisture content prior to cooking.

This method was also used for the other grains discussed below in Table 1, except for the times and temperatures which were altered as required.

In the final biscuit product individual whole barley flakes were still discernible within the bound grain mass. The grain was a warm golden toasted colour but was more brown than in Example 1.

The finished barley product can be eaten as is as a dry biscuit being tender, crisp and tasty. Alternately, the barley biscuit can be served as a breakfast cereal in a bowl with hot or cold milk or a milk substitute.

In cold milk the barley biscuits made in examples 1 and 3 have a fresh, crispy and crunchy texture. The grains within the biscuit soften quite slowly without the biscuit losing its overall shape or dispersing into the milk. Surprising, the individual flaked grains maintain their identity even though they eventually become softer with time. The waxy barley BCB has a pleasant roasted flavour with a slightly sweet malty character. They maintain a distinct crispness for 6 minutes and become soft only after about 8 minutes (See Tables 1 and 2). In comparison, commercially produced wheat BCBs become soft in 2 minutes and mushy in 3 minutes in cold milk.

Hot milk can also be used to make a convenient hot cereal where the barley grains also remain integral as they soften, maintaining at the same time the form of the integral biscuit.

Other variations with this barley cereal include flavouring the grains with fruit juice concentrates and/or adding dried fruits or other flavour components by incorporating them at various stages of the process. This invention allows for the addition of the heat-sensitive flavour and vitamin components to the already cooked grains. This may occur either prior to flaking or after flaking, after which only a minimal heat application at relatively low toasting temperatures need be used. Larger sized inclusions can be incorporated after flaking but before agglomeration prior to toasting. Alternatively, the toasted biscuit may be enrobed for example with a chocolate or other coverture or the biscuits may be formed into a sandwich with a cream filling in between as for bakery biscuits or cookies. Even if the biscuits are made without any additions except water, the final waxy barley biscuit develops a warm golden colour. By contrast commercial non-waxy wheat biscuits are a grey brown colour even when sugar and malt have been added.

Efficiencies of Processing

Table 1, compares the minimum cooking parameters which are required to produce several grain biscuit types. Even after 50 minutes of cooking at 125° C., the non-waxy barley product was more dense, more fragile and had a raw starchy character when compared with the waxy barley product cooked for only 30 minutes. Also, the non-waxy barley biscuit was not as crisp and, as shown in Table 1, lost its crispness and became mushy more quickly than the waxy barley biscuit. Thus a significant energy saving is achieved as seen in a 40% reduction in cook time when waxy barley is compared with non-waxy barley. Additionally further efficiency derives from the capacity of cooking equipment by virtue of the shorter cook time per batch. A cook time of 30 minutes can reasonably be carried out using continuous cooking equipment whereas cook times of 50 minutes and more become uneconomical using continuous cooking equipment. The flavour of the non-waxy barley biscuit in Table 1 was not malty, slightly bitter and had a bland flavour. The organoleptic quality of the waxy barley was considered superior to the non-waxy barley biscuit.

TABLE 1

| PARAMETER | WAXY BARLEY | NON-WAXY BARLEY |
|---|---|---|
| Cook | 30 min, 125° C. | 50 min, 125° C. |
| Texture | crisp and tender | crisp but dense |
| Bowl Life* | 8 | 5 |

*Bowl life is the time (min) for BCB in cold milk to become mushy

Bowl Life Analysis

The "bowl life" of a breakfast cereal is defined here as the time it takes for a breakfast cereal to lose its substantially crisp texture when immersed in cold milk. The bowl life of the waxy barley biscuit product, was compared with a commercial wheat based breakfast biscuit product and with biscuits made from non-waxy barley by the method described in Example 1. A single breakfast biscuit of each type weighing 16 grams was submerged in cold milk (38 ml, 6–8° C.) in identically sized bowls. Equal samples were take at 1 minute intervals and tasted for texture. The results are given in Table 2. It was found that the texture of the waxy barley biscuit was quite different from the commercial wheat biscuit as seen in the considerably longer "bowl life" of the waxy barley biscuit. It is clear that the waxy character imparts a longer bowl life because the non-waxy barley biscuit product became softer more quickly. The end-point was when the product became "mushy". When non-waxy barley was used instead of waxy barley in the above example, significantly more energy input was required to achieve a crisp product. The texture of the non-waxy barley biscuit was different from waxy barley biscuits in that the non-waxy barley biscuit remained less tender even when the degree of cooking was extended.

Bowl-Life

The Bowl-Life End-point for the three biscuit types was:

waxy barley 8 minutes non-waxy barley 5 minutes commercial wheat 3 minutes

TABLE 2

| MINUTES | BARLEY WAXY | WHEAT NON-WAXY | BARLEY NON-WAXY |
|---|---|---|---|
| 0 | crisp, crunchy | crisp | crunchy |
| 1 | crisp, crunchy | soft, crisp | soft, crunchy |
| 2 | soft, crunchy | soft | soft, crunchy |
| 3 | soft, crunchy | mushy | soft |

TABLE 2-continued

| MINUTES | BARLEY WAXY | WHEAT NON-WAXY | BARLEY NON-WAXY |
|---|---|---|---|
| 4 | soft, crunchy | mushy | soft |
| 5 | soft, crunchy | mushy | mushy |
| 6 | soft | mushy | mushy |
| 7 | soft | mushy | mushy |
| 8 | mushy | mushy | mushy |

EXAMPLE 4

A ready-to-eat corn (maize) biscuit cereal product was made from whole waxy corn grain. The whole grain was steeped in water at 80° C. to a moisture content of 33%. The hydrated grains were then cooled in live steam at 128° C. for 48 minutes to achieve gelatinisation. The cooked whole grains were passed while hot through a roller mill with a gap width (between the rolls) of 1.4 mm and then dried at 70° C. to 26% moisture content. These partly dried grains were then tempered at 24° C. in a sealed container for one hour and then rolled at a gap width of 0.12 mm. This two step rolling regime aided in the efficiency of rolling large grains such as corn, and was also beneficial for producing fine whole flakes suitable for toasting into biscuits. However a single rolling operation using a gap of 0.12 mm is also possible. The flakes were packed into forms made from stainless steel mesh of the required dimension to give a suitable breakfast cereal shaped biscuit (eg; 22 g grain/15×75×51 mm mould). The formed corn was then toasted at 130° C. for 13 minutes in a hot forced air toaster with air blown through the biscuit as in example 1. to achieve even heat distribution throughout the biscuit. The final moisture content was 2–3%. The resultant corn biscuits were pale golden yellow. The biscuits were tender and crisp with a distinctly toasted corn flavour. The average bowl life in cold milk was 5 minutes.

Alternately, the flaked corn was coated with a flavouring solution prior to agglomeration and toasting. This solution was a as follows: brown sugar 25.8%; malt extract 8.6%; NaCl 1.1%; water 64.5%. The solution was heated to 60° C. and sprayed onto the flaked corn as they were tumbled in a mixer at a rate of 20% of the flake weight. The coated flakes were packed into the toasting forms as described in example 1, and toasted at 130° C. at maximum fan velocity for 13 minutes. The flavoured corn biscuits were a rich golden brown colour with attractive toasted flavours.

EXAMPLE 5

Rice biscuits were made from whole grains of waxy brown rice. The waxy brown rice was hydrated to a moisture content of 18% with water. The hydrated grains were cooked in an autoclave in live steam at 125° C. for 40 minutes after which the grains were gelatinised and remained separate. The cooked grains while still hot were passed through a roller mill at a gap width of 0.03–0.04 mm. The rolled grains were packed into metal forms for toasting (22 g rice/15×75×51 mm mould). The surface moisture spray enhanced the cohesiveness of the flakes in the final biscuit product. However, if no spray were applied, the flakes adhered together well and provided a final biscuit product with good cohesiveness. The formed grain was toasted at 130° C. for 13 minutes. The resultant toasted biscuits were light brown in colour and the individual grain flakes were discernible. The texture of the biscuits were crisp and tender. The bowl life was 7 minutes.

EXAMPLE 6

A breakfast biscuit cereal was made from a mixture of waxy barley and rye gain by combining 90% dehulled waxy barley with 10% non-waxy rye grains. This mixture was hydrated at 24° C. with a solution containing 22.5% sucrose, 5.5% NaCl and 72% water to a moisture content of 24%. The hydrated grams were then cooked in an autoclave in live steam at 125° C. for 30 minutes. The gelatinised grains were integral and separate at this stage and they were then passed through a roller mill while still hot at a gap width of 0.03–0.04 mm. The flaked grain was immediately packed into forms (22 g grain/15×75×51 mm mould) and toasted at 130° C. for 15 minutes in a forced hot air toaster. The final barley and rye biscuits had a moisture content of 2–3%. They were light and crisp and tender in texture and a light golden brown colour with an attractive mix of darker rye grains throughout. The bowl life in cold milk was 8 minutes.

It is to be clearly understood that the present invention has been described by way of example only and that modifications and/or alterations which would be obvious to a person skilled in the art, based upon teaching herein, are also considered to be included within the scope and spirit of the invention as described herein and defined within the appended claims.

What is claimed is:

1. A breakfast cereal biscuit comprising agglomerated flaked grain, said grain comprises waxy grain in an amount of at least 20% by weight of total grain content wherein said grain has been hydrated and cooked so that substantially all of the starch content in said grain is gelatinized and as a result said grain is able to be agglomerated without the need for additives.

2. A breakfast cereal biscuit as claimed in claim 1 which additionally comprises any one or more of other grain or grain products, nuts, fruits, fruit juice, nutritional supplements, flavours, colours, salt, sweeteners and/or stabilizers.

3. A breakfast cereal biscuit as claimed in claim 1 wherein said waxy grain is selected from the group consisting of barley, corn, wheat, rice and sorghum.

4. A breakfast cereal biscuit as claimed in claim 3 wherein said waxy grain is barley.

5. A breakfast cereal biscuit as claimed claim 3 wherein said waxy grain comprises at least 50% by weight of total grain content.

6. A breakfast cereal biscuit as claimed in claim 3 wherein said waxy grain comprises at least 90% by weight of total grain content.

7. A breakfast cereal biscuit as claimed claim 3 wherein said waxy grain comprises 100% by weight of total grain content.

8. A breakfast cereal biscuit as claimed in claim 4 wherein said barley is hydrated to a moisture content of up to 30% w/w.

9. A breakfast cereal biscuit as claimed in claim 8 wherein said barley is hydrated to a moisture content of from 24 to 29% w/w.

10. A breakfast cereal biscuit as claimed in claim 9 wherein said barley is hydrated to a moisture content of about 29% w/w.

11. The breakfast cereal biscuit of claim 1 wherein the grain has been hydrated and cooked sequentially, rolled into flakes, and either (1) agglomerated, toasted and cut into a desired biscuit shape, or (2) agglomerated into a desired biscuit shape and toasted, or (3) toasted and agglomerated into a desired biscuit shape.

12. The breakfast cereal biscuit of claim 1 wherein the grain has been hydrated and cooked simultaneously, rolled into flakes, and either (1) agglomerated, toasted and cut into a desired biscuit shape, or (2) agglomerated into a desired biscuit shape and toasted, or (3) toasted and agglomerated into a desired biscuit shape.

13. The breakfast cereal biscuit of claim 1 wherein the grain has been partially hydrated prior to cooking followed by balancing moisture during the cook phase, rolled into flakes, and either (1) agglomerated, toasted and cut into a desired biscuit shape, or (2) agglomerated into a desired biscuit shape and toasted, or (3) toasted and agglomerated into a desired biscuit shape.

14. A process for producing a breakfast cereal biscuit comprising the steps of
   a. selecting grain which comprises waxy grain in an amount of at least 20% by weight of total gram content;
   b. sequentially hydrating and cooking said grain to gelatinize substantially all of the starch within said grain;
   c. rolling said cooked grain into flakes; and either
   d. agglomerating the flakes of step c) into a desired biscuit shape, and toasting; or
   e. agglomerating the flakes of step c) and toasting, and cutting the toasted product into a desired biscuit shape; or
   f. toasting the flakes of step c), and agglomerating the toasted product into a desired biscuit shape.

15. A process for producing a breakfast cereal biscuit comprising the steps of
   a. selecting grain which comprises waxy grain in an amount of at least 20% by weight of total grain content;
   b. simultaneously hydrating and cooking said grain to gelatinize substantially all of the starch within said grain;
   c. rolling said cooked grain into flakes; and either
   d. agglomerating the flakes of step c) into a desired biscuit shape, and toasting; or
   e. agglomerating the flakes of step c) and toasting, and cutting the toasted product into a desired biscuit shape; or
   f. toasting the flakes of step c), and agglomerating the toasted product into a desired biscuit shape.

16. A process for producing a breakfast cereal biscuit comprising the steps of
   a. selecting grain which comprises waxy grain in an amount of at least 20% by weight of total grain content;
   b. partially hydrating said grain prior to cooking followed by balancing moisture of said grain during the cook phase to gelatinize substantially all of the starch within said grain;
   c. rolling said cooked grain into flakes; and either
   d. agglomerating the flakes of step c) into a desired biscuit shape, and toasting; or
   e. agglomerating the flakes of step c) and toasting, and cutting the toasted product into a desired biscuit shape; or
   f. toasting the flakes of step c), and agglomerating the toasted product into a desired biscuit shape.

17. The process according to any one of claims 14–16 including the additional step of adding one or more of other grain or grain products, nuts, fruits, fruit juice, nutritional supplements, flavors, colors, salt, sweeteners and/or stabilizers.

18. The process according to anyone of claims 14–16 wherein said waxy grain is selected from barley, corn, wheat, rice and/or sorghum.

19. A process as claimed in claim 18 wherein said waxy grain is barley.

20. A process as claimed in claim 18 wherein said waxy grain comprises at least 75% by weight of total grain content.

21. A process as claimed in claim 18 wherein said waxy grain comprises at least 90% by weight of total grain content.

22. A process as claimed in claim 18 wherein said waxy grain comprises 100% by weight of total grain content.

23. A process as claimed in claim 19 wherein said barley is hydrated to a moisture content of up to 30% w/w.

24. A process as claimed in claim 23 wherein said barley is hydrated to a moisture content of from 24 to 29% w/w.

25. A process as claimed in claim 24 wherein said barley is hydrated to a moisture content of about 29% w/w.

26. A breakfast cereal biscuit prepared by the process of any one of claims 14–16.

27. The process of any of claims 14–16, wherein said grain is hydrated to increase the moisture content of said grain to at least 17%.

28. The process of any of claims 14–16, wherein said grain is cooked for at least 20 minutes at a temperature higher than 100° C. to increase the moisture content of said grain to at least 17%.

29. The process of claim 28, wherein said grain is cooked for about 20–90 minutes.

30. The process of claim 16, wherein said partially hydrated grains prior to cooking are followed by balancing the moisture to at least 17%.

* * * * *